Nov. 10, 1953 W. M. PHARIS 2,658,949
TELEPHONE SELECTOR CIRCUIT
Filed July 3, 1950
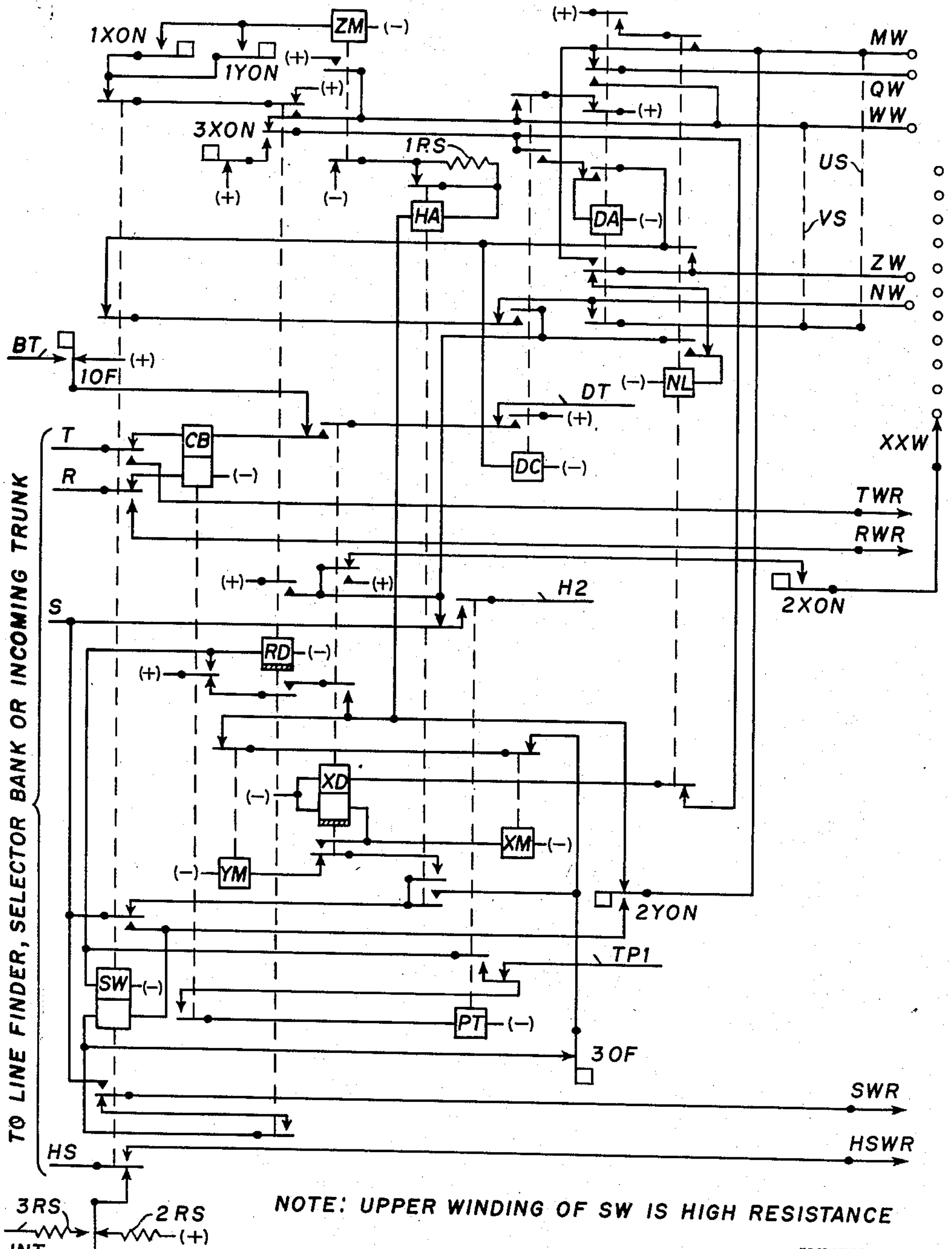
INVENTOR.
WILLIAM W. PHARIS
BY Winfred T. Powell
ATTORNEY Patented Nov. 10, 1953 2,658,949

UNITED STATES PATENT OFFICE 2,658,949

TELEPHONE SELECTOR CIRCUIT

William W. Pharis, Rochester, N. Y., assignor to Stromberg-Carlson Company, a corporation of New York Application July 3, 1950, Serial No. 171,874

6 Claims. (Cl. 179—18)

This invention relates to automatic telephone systems in general, but more particularly to selector switches for use in such systems.

In certain automatic switches of the above mentioned type, ten levels are available, each level having access to a separate group of trunks. In certain other automatic switches, for example the so called XY switch, eleven levels are available to each selector switch, one of which is a normal level, this level being selected by operating the switch in its secondary direction without first operating the switch in its primary direction.

The object of this invention is a circuit arrangement for an automatic switch of the XY type whereby the normal level may be used for an eleventh level, thus providing eleven levels or groups of trunks to which the selector has access.

A further object of the invention is a circuit arrangement for providing digit canceling when a particular level above the normal level is selected, with an arrangement for selecting and using trunks in this particular level when the digit associated therewith is again dialed, following the digit canceling digit.

Still another object of this invention is a circuit arrangement for causing the selector switch to cancel a predetermined first digit dialed, drop back to normal and then select a trunk in the normal level before the second digit is dialed, thus providing eleven levels or groups of trunks in a first selector operating in the well known decimal system.

Systems are known in which an eleven level selector is used, such as the use of the normal level to select trunks to an operator in response to a permanent signal condition on a line. Also systems are known where the use of the normal level in a selector is effected by the removal of the receiver and the failure to dial a digit within a predetermined time, for selecting trunks to an operator, thus permitting the use of the usual ten levels in the first selector switches for calls to ten separate groups in an automatic telephone system, plus an additional group of trunks leading to an operator's position. This particular invention pertains to a system which distinguishes from the two systems just mentioned in that there are eleven groups of trunks available from first selectors, for example, each of these groups of trunks being selected in response to digits dialed from the calling telephone.

Other features of the invention not specifically mentioned will be apparent from the following description.

The single sheet of drawing shows the circuit details of a first selector switch of the XY type operating in a manner above set forth.

For the purpose of simplifying the illustration and facilitating the explanation, various parts and circuits constituting the embodiment of the present invention have been shown diagrammatically and certain conventional illustrations have been employed, the drawings having been made more with the purpose of making it easy to understand the operation of the circuits than with the idea of illustrating the specific construction and arrangement of parts that would be employed in practice. For example, the various relays and their contacts are illustrated in a conventional manner and symbols are used to indicate the connections to the terminals of batteries or other sources of current instead of showing all the wiring connections to these terminals. The relays are given reference characters indicating the mode of operation in the circuit. For example, relay CB is the calling bridge relay, relay RD is the release delay relay and relay XD is the delay relay following the X operation of the switch. (+) and (−) symbols are employed to indicate the positive and negative terminals respectively of the usual central office common battery instead of using the ground and battery symbols frequently found in telephone circuits, it being understood that the (+) terminal is connected to ground. The contacts of the various relays are located at various distances from the block representing the winding of the associated relay and those contacts controlled by a relay are indicated as being associated therewith by means of a dashed line.

With this general description of the object of the invention and the apparatus involved in mind, a detailed description of the operation under various conditions will now be given. It will be convenient to give several examples of the circuit operation, such as when no digit canceling and no normal level operation are provided, first digit canceled and re-use of same level, digit canceled and the use of the normal level provided, etc.

*First Example*

In this example, it will be assumed that no digit canceling is provided and that no normal level operation is effected. When the selector operates in this manner in a particular system or group, the XX bank of the level associated with the digit involved, at which point wiper XXW stops, a jumper is connected from the terminal MW to the XX bank of this level. Strap wires US and VS are omitted.

When the selector is seized, either by way of a calling line switch, line finder, or the like, the closed circuit across the calling line operates relay CB over a circuit extending from (+), normally closed contacts 1OF of the overflow springs, break contact of relay XD, upper winding of relay CB, break contact of relay SW, tip trunk conductor T and over the preceding circuits including the calling line and calling substation, trunk conductor R, break contact of relay SW and lower winding of relay CB to (−). Relay CB closes a circuit for operating relay RD extending from (+), make contact of relay CB and winding of relay RD to (−). A circuit from this same (+) may be traced through the upper winding of switching relay SW to (−) for energizing this relay at a low level, thus priming it (but not operating it) so that it will quickly operate when its lower winding is energized.

The operation of relay RD applies (+) potential to sleeve conductor S for holding the preceding circuits and for making this selector busy. This circuit may be traced from (+), make contact of relay RD, break contact of relay PT and conductor S to the preceding circuits (not shown). A circuit is now closed for operating X delay relay XD which may be traced from (+), normally closed X off normal contact 3XON, make contact of relay RD, break contact of relay NL and upper winding of relay XD to (−). Dial tone is now applied to the calling line over a circuit which may be traced from the common dial tone conductor DT, break contact of digit canceling relay DC, make contact of relay XD and through the upper winding of relay CB to the calling line.

The calling party now dials the first digit, it being assumed that this is digit 3 and that wiper XXW stops at the third level in contact with the terminal to which jumper MW is cross-connected. It is well understood how the three impulses transmitted from the calling dial cause relay CB to momentarily release three times in response to these impulses, after which it remains operated. The first release of relay CB closes a circuit for "hunt assist" relay HA which may be traced from (+), break contact of relay CB, make contact of relay RD, make contact of relay XD, winding of relay HA, break contact of relay HA and break contact of release magnet ZM to (−). The operation of relay HA opens up its uppermost break contact for inserting resistor 1RS in series with its winding, thus providing a circuit arrangement for making relay HA fast to operate and fast to release. Relay HA closes a locking circuit for itself which may be traced from (+) on conductor S (above traced), break contact of relay SW, make contact of relay HA, break contact of X stepping magnet XM, break contact of Y stepping magnet YM and through the winding of relay HA to (−) over the previously described circuit. A circuit is also completed at this time for operating magnet XM which may be traced from (+) on conductor S, break contact of relay SW, make contact of relay HA, make contact of relay XD and winding of magnet XM to (−). The lower winding of relay XD is connected in multiple with magnet XM, consequently the impulses applied to magnet XM are intermittently applied to the lower winding of the XD relay for holding this relay operated during impulsing, this because relay XD is slow acting. The operation of relay XM opens up the above described locking circuit for relay HA but this relay does not release until relay CB is operated at the end of the impulse for opening up the above described operating circuit for relay HA. This locking circuit for relay HA insures that the X magnet will complete its step before relay HA can be released for opening the operating circuit of the X magnet, even though a short impulse should be received by the CB relay.

The operation of relay CB at the end of the impulse opens up and releases relay HA and this relay in turn opens up and releases magnet XM, as well as opening up the above described locking circuit for the lower winding of relay XD. Relay XD does not release before relay CB is again released to transmit the second impulse for operating and locking relay HA, for locking relay XD and for operating magnet XM to cause the switch to take its second step. The operation of relay CB at the end of the second impulse opens up and releases relay HA, which in turn opens up the locking circuit for the XD relay and the operating circuit for magnet XM, thus leaving the switch at its second level. Now when the third impulse is received, relay HA is operated and locked, relay XD is locked and magnet XM is operated as before for advancing the selector switch to the third level. At the end of this third impulse, relay HA releases for effecting the release of magnet XM and the locking circuit for relay XD is opened long enough to permit the release of this relay.

The release of relay XD causes the selector to hunt in the selected (third, for example) level by closing another operating circuit for relay HA which may be traced from (+), make contact of relay RD, break contact of relay XD, off normal contact 2XON, wiper XXW and its associated contact, conductor MW, normally closed contact 2YON and winding of relay HA to the previously described (−). Relay HA closes the previously described locking circuit for itself, including the break contacts of magnets XM and YM, and an operating circuit for magnet YM which may be traced from (+) on conductor S, break contact of relay SW, make contact of relay HA, break contact of relay XD and winding of magnet YM to (−). It might be mentioned at this time that the release of relay XD at the end of the first digit opens up and removes the dial tone from the calling line.

The operation of magnet YM steps the wipers TWR, RWR, SWR and HSWR (but not wiper XXW) on to the first terminal in the selected level. Magnet YM opens up the locking circuit for relay HA for effecting the release of this relay, which in turn opens up and releases magnet YM. It will be assumed that the first trunk in the selected level is busy, due to (+) potential being found on the terminal to which wiper SWR is connected. Consequently, when magnet YM releases, a circuit is closed for again operating relay HA which may be traced from wiper SWR, break contact of relay SW, make contact of relay RD, overflow contact 3OF, break contacts in series of magnets XM and YM and winding of relay HA to (−). Relay HA closes the previously described locking circuit for itself and the previously described operating circuit for magnet YM for causing this magnet to advance the wipers of the switch to the second terminal in the selected level. The operation of magnet YM opens up and releases relay HA which in turn opens up and releases magnet YM. This same stepping circuit is effective to advance the switch in its Y direction over busy terminals. During this advance over busy terminals, the lower winding of relay SW is short circuited to prevent its operation while the switch is trunk hunting. One short circuit path is effective as long as relay HA is operated and may be traced from (+) on conductor S, break contact of relay SW, make contact of relay HA and contact 3OF to the left hand terminal of the lower winding of relay SW. The right hand terminal of this same winding may be traced to (+) over a circuit extending from (+), make contact of relay RD, break contact of relay XD, contact 2XON, wiper XXW, conductor MW and contact 2YON to the right hand terminal of the SW relay winding. During the release of relay HA, when busy terminals are encountered, the lower winding of relay SW is short circuited, the circuit of the right hand terminal of the lower winding being as previously traced, while the circuit to the left hand terminal of this winding extends to (+) by way of wiper SWR.

When relay HA releases to cause magnet YM to release at a terminal associated with an idle trunk, relay SW is operated over a circuit which may be traced from (+), make contact of relay RD, break contact of relay XD, off normal contact 2XON, wiper XXW and its associated terminal, conductor MW, off normal contact 2YON, lower winding of relay SW, contact 3OF, break contacts in series of magnets XM and YM, winding of relay HA, break contact of relay HA and break contact of magnet ZM to (—). Relay HA is marginal in its operation and does not operate in series with the lower winding of relay SW, but relay SW does operate for opening up and releasing relay CB. Relay CB opens up and releases relay RD. The calling line conductors are extended by way of wipers TWR and RWR to a relay similar to relay CB in the circuit associated with the selected trunk, thus operating this CB relay for in turn operating an associated RD relay for extending (+) potential back over the trunk conductor with which wiper SWR is in contact for locking relay SW over a circuit extending from wiper SWR, make contacts in series of relay SW and lower winding of this relay to (—) through the winding of relay HA. It will be obvious that this (+) is returned from the circuit ahead and is applied to conductor S for holding the preceding circuits and for holding relay SW before relay RD of the illustrated selector is released for removing (+) from the circuits of relay SW and the preceding switch or switches.

When the connection is released, the CB and RD relays of the last switch in the train are released for disconnecting (+) from the conductor with which wiper SWR is associated, thus de-energizing conductor S leading back to the preceding circuits for restoring the circuits to normal. This also effects the release of relay SW which in turn closes a circuit for the release magnet ZM which may be traced from (+), break contact of relay RD, break contact of relay SW, off normal contacts 1XON and 1YON in multiple and magnet ZM to (—). Magnet ZM releases the switch and disconnects (—) from relay HA for preventing the operation of this relay on the drop back of the switch. Magnet ZM also closes a circuit for operating relay XD which may be traced from (+), make contact of magnet ZM, break contact of relay RD, break contact of normal level relay NL and upper winding of relay XD to (—). Relay XD applies (+) to sleeve conductor S over a circuit which may be traced from (+), make contact of relay XD, break contact of relay HA and conductor S for making this selector busy until the switch is completely released, at which time off normal contacts 1XON and 1YON are opened for releasing relay ZM, which in turn opens up the above described circuit for relay XD, thus releasing this relay and disconnecting (+) from conductor S for rendering this selector circuit idle and again selectable.

*Second Example*

In this example, it will be explained how the first digit (digit 1, for example) is canceled, with the re-use of the same level (level 1, for example), with the dial tone being removed after the first digit. To effect this operation the terminal of this digit canceling level, to which wiper XXW is connected, is jumpered to conductor NW, the US strap is connected and the VS strap is omitted.

When the selector is seized, relays CB, RD and XD are operated, the dial tone is connected to the calling line and (+) potential is applied to sleeve conductor S all in the previously described manner. When relay CB releases to mark the beginning of the impulse, relay HA is operated and locked, magnet XM is operated and relay XD is locked all in the previously described manner. When relay CB is operated at the end of this impulse, it remains operated because this is the end of the digit, thus effecting the release of relays HA and XD and the release of magnet XM, leaving the switch opposite the first level. The release of relay XD disconnects dial tone from the calling line.

A circuit is now closed for operating digit canceling relay DC which may be traced from (+), make contact of relay RD, break contact of relay XD, off normal contact 2XON, wiper XXW and its first level terminal, conductor NW, break contact of relay DC, break contact of relay SW and winding of relay DC to (—). Relay DC closes a locking circuit for itself extending from (+), make contact of relay RD, make contact of relay DC, break contact of relay SW and winding of relay DC to (—).

The switch is now restored to normal by operating the release magnet over a circuit extending from (+), break contact of digit absorbing relay DA, make contact of relay DC, make contact of relay RD, break contact of relay SW, off normal contacts 1XON and 1YON in multiple and winding of magnet ZM to (—). Magnet ZM closes a locking circuit for itself to maintain this magnet energized until the switch is restored to normal, this locking circuit being traced from (+), make contact of magnet ZM, make contact of relay RD, break contact of relay SW, off normal contacts 1XON and 1YON and winding of magnet ZM to (—). When the switch is restored to normal, contacts 1XON and 1YON are opened for de-energizing magnet ZM.

With the switch in its normal position, a circuit is closed for operating relay DA which may be traced from (+), normally closed contact 3XON, make contact of relay RD, make contact of relay DC, break contact and winding of relay DA to (—). Relay DA closes a locking circuit for itself extending from the previously described locking circuit for relay DC, make contact and winding of relay DA to (—). Since the switch is in its normal position, the previously described operating circuit for relay XD is again closed, but the dial tone is not applied to the calling line this time because it is open at a break contact of relay DC.

It will now be assumed that the second digit (number 1) is dialed, thus effecting the momentary release of relay CB. This release of relay CB closes the previously described operating circuit for relay HA and it is locked in the previously described manner. Relay HA closes the previously described operating circuit for magnet XM and, since relay HA is released by the operation of relay CB at the end of the impulse, magnet XM is released and relay XD is released because relay CB remains operated. This again sets the switch opposite the first level. The release magnet is not energized this time because its previously described energizing circuit is open at a break contact of relay DA. A circuit is now closed for operating relay HA which may be traced from (+), make contact of relay RD, break contact of relay XD, contact 2XON, wiper XXW and the terminal of the first level, conductor NW, make contact of relay DA, strap US, break contact 2YON and winding of relay HA to (—) at the break contact of magnet ZM. The previously described locking circuit for relay HA and the previously described operating circuit for magnet YM are now closed. When magnet YM operates it opens up and releases relay HA for in turn opening up and releasing magnet YM. This sets the switch in contact with the first terminal in the first level and it will be assumed that the trunk associated with this set of terminals is idle, thus operating and locking relay SW for releasing relays CB and RD of the selector all in the previously described manner. The operation of relay SW opens up the above described locking circuits for relays DC and DA for effecting the release of these relays.

When the connection is released, the (+) potential is removed from the terminal to which wiper SWR is connected for effecting the release of relay SW, the operation of magnet ZM and relay XD, for momentarily disconnecting (+) from sleeve conductor S, for releasing the preceding circuits and for guarding this switch until the switch is restored to normal all in the previously described manner. It will thus be seen that, in this example, a predetermined digit may be canceled by causing the release of the switch from the level associated with this digit and that the same digit may be dialed for causing the switch to select a trunk in this same level, with the dial tone being removed and kept off the calling line after the first digit is recorded.

*Third Example*

In this example it will be assumed that the first digit (digit 1, for example) is canceled without the re-use of this level (first level, for example) and without the removal of the dial tone following the dialing of this same digit any number of times. In other words, if number 1 is dialed a plurality of times, the switch will be released each time this digit is dialed and dial tone will be reconnected to the calling line following each digit. This is effected by connecting the XX bank terminal to wire WW and omitting the VS and US straps.

The operation in this case is the same as in the previous example except that relay DC is not operated because conductor NW is not connected to the XXW terminal. Since relay DC is not operated, relay DA cannot be operated and when relay XD is released at the end of the first digit, dial tone is removed from the calling line and a circuit is closed for operating magnet ZM which may be traced from (+), make contact of relay RD, break contact of relay XD, contact 2XON, wiper XXW and its terminal, wire WW, make contact of relay RD, break contact of relay SW, off normal contacts 1XON and 1YON in multiple and winding of magnet ZM to (—). Magnet ZM locks itself operated until the switch is restored to normal by way of a circuit extending from (+), make contact of magnet ZM, make contact of relay RD and over the previously described circuit to the winding of magnet ZM. When the switch is restored to normal, magnet ZM is deenergized and relay XD is again energized in the previously described manner. Since relay DC is not operated, the operation of relay XD again applies dial tone to the calling line.

Now when the same digit is dialed, relay HA is operated and locked, magnet XM is operated, after which relay HA is released and magnet XM is released and then relay XD releases to remove the dial tone from the line and for again operating magnet ZM by way of conductor WW in the previously described manner. When the switch is restored to normal relay XD is again operated as before, thus placing the circuit in the same condition as when seized ready for a release operation from the calling station, ready for receiving digit number 1 again for repeating the above described operations, or ready for the dialing of some other digit for causing the switch to cut through to the selected trunk.

*Fourth Example*

In this example, it will be assumed that the first digit (digit 1, for example) is canceled without the re-use of this same digit (number 1) and that the dial tone is disconnected after the first digit is dialed. To effect this operation, the XX bank terminal (number 1 level, for example) is connected to conductor NW, the VS strap is connected and the US strap is omitted.

When the selector is seized and the first digit (number 1) is dialed, the relay and switch operations are the same as in the previously described second example, since the XXW terminal of this level is connected to wire NW, relays DC and DA being operated. In this fourth example however, the VS strap is connected and the US strap is omitted. Now when the second digit (number 1 for example) is dialed, the release of relay XD at the end of this digit closes a circuit for operating release magnet ZM. This is because relays DC and DA are operated and strap VS is connected. This circuit may be traced from (+), make contact of relay RD, break contact of relay XD, off normal contact 2XON, wiper XXW and the associated terminal at the first level, conductor NW, make contact of relay DA, strap VS, make contact of relay RD, break contact of relay SW, off normal contacts 1XON and 1YON in multiple and winding of magnet ZM to (—). Magnet ZM operates, locks and restores the switch to normal, after which relay XD is again operated all in the previously described manner. This places the circuits in condition for a release operation from the calling station, for dialing number 1 again to repeat the release operation, or for dialing some other digit to cut through to the selected trunk.

*Fifth Example*

In this example the predetermined second digit is canceled when this digit is unlike the first digit. For example, the first digit (number 1) may be canceled as in the second and fourth examples and the second digit (number 2 for example) may be canceled. To accomplish this operation, conductor QW is connected to the XXW terminal of the second level, the first level jumper being the same as previously described.

When number 1 is dialed for the first digit the operation is the same as described in connection with the second and fourth examples, in which case relays DC, DA and XD are operated when the switch is restored to its normal position. Now when the second digit is dialed, relay HA is intermittently operated and magnet XM is intermittently stepped to advance the switch to the second level, the circuits for this operation being obvious from the previous description. When relay XD is released at the end of this second digit a circuit is closed for operating magnet ZM over a path extending from (+), make contact of relay RD, break contact of relay XD, off normal contact 2XON, wiper XXW and its second level terminal, conductor QW, make contact of relay DA, make contact of relay RD, break contact of relay SW, off normal contacts 1XON and 1YON in multiple and winding of magnet ZM to (−). The switch is restored to normal, after which magnet ZM is released and relay XD is operated as in the previously described manner. This places the circuits in condition for a release operation by the calling party, or for dialing number 2 again to repeat this digit canceling operation or for dialing some other digit to cut through to the selected trunk.

With this arrangement of jumper and strap connections, if number 2 is dialed for the first digit, instead of the second digit, the digit canceling operation will not be effected. This is because when relay XD is released following the transmission of the two impulses, a circuit is closed for operating stepping relay HA which may be traced from (+), make contact of relay RD, break contact of relay XD, off normal contact 2XON, wiper XXW and its second terminal, conductor QW, break contact of relay DA, normally closed contact 2YON, winding of relay HA, break contact of relay HA and break contact of magnet ZM to (−). This operates and locks relay HA for operating magnet YM for selecting an idle trunk in the second level, after which relay SW is operated for switching through to the selected trunk all in the previously described manner.

*Sixth Example*

This is an example of the operation of the switch when a predetermined first digit effects the release of the selector switch and the conditioning of the circuits for automatically selecting a trunk in the normal level, all in response to the dialing of this predetermined first digit. To cause the switch to operate in this manner it will be assumed that number 1 is the first digit and that conductor ZW is connected to the XXW terminal at the first level.

The relay operations and the connection of the dial tone to the calling line are the same as in previous examples up to the point where relay XD is released at the end of the first digit. The release of relay XD closes a circuit for operating normal level relay NL, this circuit being traced from (+), make contact of relay RD, break contact of relay XD, off normal contact 2XON, wiper XXW and its first terminal, conductor ZW, break contact of relay DA, break contact and winding of relay NL to (−). Relay NL closes a locking circuit for itself extending from (+), make contact of relay RD, make contact and winding of relay NL to (−). A circuit is now closed for operating relay DC which may be traced from (+) by way of conductor ZW (previously described), make contact of relay NL and winding of relay DC to (−). Relay DC closes a locking circuit for itself extending from (+), make contact of relay RD, make contact of relay DC, break contact of relay SW and winding of relay DC to (−). The operation of relay NL opens up the circuit to the upper winding of relay XD so that this relay will not be operated when relay DC operates. With relay XD released, the dial tone is kept off the calling line.

A circuit is now closed for operating magnet ZM which may be traced from (+), break contact of relay DA, make contact of relay DC, make contact of relay RD, break contact of relay SW, off normal contacts 1XON and 1YON in multiple and winding of magnet ZM to (−). Magnet ZM locks and restores the switch to normal, after which magnet ZM is released, in the previously described manner. A circuit is now closed for operating relay DA which may be traced from (+), normally closed off normal contact 3XON, make contact of relay RD, make contact of relay DC, break contact and winding of relay DA to (−). Relay DA closes a locking circuit for itself at its inner upper make contact, this locking circuit extending to the previously described locking circuit for relay DC. Relay HA is now operated over a circuit extending from (+), make contact of relay DA, make contact of relay NL, off normal contact 2YON in its normal position, winding of relay HA, break contact of relay HA and break contact of magnet ZM to (−). Relay HA is locked and magnet YM is energized over a circuit which may be traced from (+) on conductor S, break contact of relay SW, make contact of relay HA, one of these contacts extending to the winding of relay HA and the other extending to magnet YM through a break contact of relay XD. This operates magnet YM and causes the switch to advance in its Y or secondary direction at the normal level since the X or primary operation has been canceled. The HA relay and the YM magnet operation for selecting the idle trunk and the operation of relay SW after this trunk is selected is all in the previously described manner. When relay SW operates, relays CB and RD are released and the circuits are extended through to the selected trunk. The operation from this point need not be repeated.

If, instead of dialing number 1 for the first digit, number 1 is dialed for the second digit, after a digit canceling digit is dialed as in the second or fourth example, relays DA and DC will be in their operated position, consequently relay NL will not operate and the level one dialed for the second digit will be chosen instead of the normal level.

*Miscellaneous*

Overflow contacts 10F, 20F and 30F are provided for operation when all trunks of a level are busy and the switch wipers are advanced to the overflow position. In this event, contact 10F switches the tip conductor of the calling line from direct (+) to (+) by way of a common busy tone conductor BT, which conductor may have busy tone superimposed thereon. Contact 20F switches the HS conductor from (+) through resistor 2RS to a common interrupter circuit by way of resistor 3RS for applying a flash busy signal to conductor HS if the circuits make use of such a signal. Contact 30F opens up the operating winding of relay SW so that this relay will not be operated when the switch wipers are advanced to overflow.

Conductor HS is extended through a make contact of relay SW, when trunk selection is effected, to a similar conductor by way of wiper HSWR. This is for the purpose of providing supervision back to the originating circuit by way of conductor HS, if and when such operation is required.

Conductors H2 and TP1, connected to contacts of permanent timing relay PT, are for the purpose of effecting a time release of the circuit when the selector is seized and not advanced to its switching through position within a predetermined time interval. Since this operation of the circuit forms no part of the present invention and since it may be provided or omitted as required, the detailed operation of the time release will not be explained.

It should be understood that, while this invention has been described in connection with a particular disclosure, the invention is not limited to such a specific disclosure, but may be equally well applied to other circuit arrangements without departing from the spirit of the invention.

What I claim is:

1. In a selector switch for use in automatic telephone systems wherein the switch can be operated to off normal levels in a primary direction followed by its operation in a secondary direction to select certain trunks in the selected off normal level or in a secondary direction in a normal level following drop back from a previous operation in a primary direction to a predetermined off-normal level to thereby select other trunks in the normal level, means for transmitting digital impulses to said switch, means responsive to digital impulses comprising a first plurality of impulses for operating said switch in its primary direction to a first predetermined off normal level, means responsive to the advance of said switch to said first predetermined off normal level for causing said switch to select a trunk in said first predetermined off normal level, means responsive to digital impulses comprising a second plurality of impulses for operating said switch in its primary direction to a second predetermined off normal level, means responsive to the advance of said switch to said second predetermined off normal level for causing the release operation of said switch to its normal level, and means for thereafter causing said switch to select a trunk in said normal level.

2. In a selector switch for use in automatic telephone systems wherein the switch can be operated to off-normal levels in a primary direction followed by its operation in a secondary direction to select certain trunks in the selector off-normal level or in a secondary direction in a normal level following drop back from a previous operation in a primary direction to a predetermined off-normal level to thereby select other trunks in the normal level, means for transmitting digital impulses to said switch, means responsive to a first number of digital impulses for operating said switch in its primary direction to a first predetermined off-normal level, means responsive to the positioning of said switch at said first predetermined off-normal level for causing said switch to automatically operate in the secondary direction to select a trunk in said first predetermined off-normal level, means responsive to a second number of digital impulses different than said first set of impulses when first transmitted for operating said switch in its primary direction to a second different predetermined off-normal level, means responsive to the positioning of said switch at said second predetermined off-normal level for causing the release operation of said switch to return to its normal level, and means operated after said switch returns to its normal level from said second predetermined off-normal level to cause said switch to automatically operate in the secondary direction and select a trunk in said normal level.

3. In a selector switch having a normal level position, a primary level selecting movement responsive to digital impulses and an automatic secondary trunk selecting movement within any selected level; impulse responsive means for operating said switch in its primary movement; a release delay relay; means responsive to seizure of said selector switch and transmission of digital impulses to maintain said release delay relay operated during said primary movement of said switch in response to digital impulses and released on the completion of the digital impulses to thereafter start said secondary movement of said switch; a release magnet; a circuit for operating said release magnet to restore said switch to its normal position; circuit means operated by the release of said relay when said primary movement has stopped said switch at a predetermined level for completing said release magnet circuit whereby said switch is restored to its normal position; and means operated by the restoration of said switch to normal from said predetermined level for automatically operating said switch in the secondary trunk selecting movement in the normal level position without again operating said switch in its primary movement.

4. In a selector switch having a normal level position, a primary level selecting movement responsive to digital impulses and an automatic secondary trunk selecting movement within any selected level; impulse responsive means for operating said switch in its primary movement; a release delay relay; means responsive to seizure of said selector switch and transmission of digital impulses to maintain said release delay relay operated during said primary movement of said switch in response to digital impulses and released on the completion of the digital impulses to thereafter start said secondary movement of said switch; a release magnet; a circuit for operating said release magnet to restore said switch to its normal position; circuit means operated by the release of said relay when said primary movement has stopped said switch at any one of a plurality of predetermined levels for completing said magnet circuit whereby said switch is restored to its normal position; and means operated by the restoration of said switch to normal from only one of said plurality of predetermined levels for automatically operating said switch in the secondary trunk selecting movement in the normal level position without again operating said switch in its primary movement.

5. In a selector switch having a normal level position, a primary level selecting movement responsive to digital impulses and an automatic secondary trunk selecting movement within any selected level; impulse responsive means for operating said switch in its primary movement; a release delay relay; means responsive to seizure of said selector switch and transmission of digital impulses to maintain said release delay relay operated during said primary movement of said switch in response to digital impulses and released on the completion of the digital impulses to thereafter start said secondary movement of said switch; a release magnet; a circuit for operating said release magnet to restore said switch to its normal position; circuit means operated by the release of said relay when said primary movement has stopped said switch at any one of a plurality of predetermined levels for completing said magnet circuit whereby said switch is restored to its normal position; means operated by the restoration of said switch to normal from only one of said plurality of predetermined levels for automatically operating said switch in the secondary trunk selecting movement in the normal level position without again operating said switch in its primary movement; and means responsive to the restoration of said switch to normal from another of said predetermined levels for preventing the automatic operation of said switch in the secondary trunk selecting movement in the normal level position.

6. In a selector switch having a normal line selecting position and a plurality of off-normal line selecting positions, means for operating said switch to any one of the plurality of off-normal positions including first and second off-normal positions, means responsive to the operation of said switch to said first off-normal position for automatically operating said switch to select a line in said first off-normal position, means responsive to the operation of said switch to said second off-normal position for restoring said switch to its normal line selecting position, and means responsive to said restoration of said switch to said normal line selecting position from said second off-normal position for causing said switch to select a line in said normal line selecting position.

WILLIAM W. PHARIS.

References Cited in the file of this patent

UNITED STATES PATENTS

| Number | Name | Date |
|---|---|---|
| 1,624,329 | Gardner ---------- | Apr. 12, 1927 |
| 1,747,478 | Lomax ------------ | Feb. 18, 1930 |
| 1,883,680 | Friendly ----------- | Oct. 18, 1932 |
| 2,036,055 | Koechling -------- | Mar. 31, 1936 |